(12) United States Patent
Chitta et al.

(10) Patent No.: US 10,124,489 B2
(45) Date of Patent: Nov. 13, 2018

(54) LOCATING, SEPARATING, AND PICKING BOXES WITH A SENSOR-GUIDED ROBOT

(71) Applicant: Kinema Systems Inc., Menlo Park, CA (US)

(72) Inventors: Sachin Chitta, Menlo Park, CA (US); David Hershberger, Menlo Park, CA (US); Karl Pauwels, Menlo Park, CA (US)

(73) Assignee: Kinema Systems Inc., Menlo Park, CA (US)

( * ) Notice: Subject to any disclaimer, the term of this patent is extended or adjusted under 35 U.S.C. 154(b) by 3 days.

(21) Appl. No.: 15/419,862

(22) Filed: Jan. 30, 2017

(65) Prior Publication Data

US 2017/0246744 A1    Aug. 31, 2017

Related U.S. Application Data

(60) Provisional application No. 62/300,403, filed on Feb. 26, 2016.

(51) Int. Cl.
   *B25J 9/16* (2006.01)
   *B65G 61/00* (2006.01)

(52) U.S. Cl.
   CPC ............ *B25J 9/1687* (2013.01); *B65G 61/00* (2013.01); *G05B 2219/40006* (2013.01); *G05B 2219/40607* (2013.01)

(58) Field of Classification Search
   CPC ................................ B65G 61/00; B25J 9/1687
   See application file for complete search history.

(56) References Cited

U.S. PATENT DOCUMENTS

| | | | | |
|---|---|---|---|---|
| 5,908,283 A | * | 6/1999 | Huang | B65G 47/90 414/21 |
| 9,315,344 B1 | * | 4/2016 | Lehmann | G06Q 10/08 |
| 9,486,921 B1 | * | 11/2016 | Straszheim | B25J 9/1679 |
| 9,707,682 B1 | * | 7/2017 | Konolige | B25J 9/163 |
| 9,802,317 B1 | * | 10/2017 | Watts | B25J 9/1687 |
| 2009/0069939 A1 | * | 3/2009 | Nagatsuka | B25J 9/1671 700/258 |
| 2010/0222915 A1 | * | 9/2010 | Kuehnemann | B65G 57/00 700/217 |
| 2015/0203304 A1 | | 7/2015 | Morency et al. | |
| 2017/0248966 A1 | * | 8/2017 | Lutz | G05D 1/0291 |

FOREIGN PATENT DOCUMENTS

| | | | | |
|---|---|---|---|---|
| JP | H03234491 | | 10/1991 | |
| JP | H0797057 | | 4/1994 | |
| JP | 3063487 | * | 7/2000 | |
| JP | 3063487 B2 | * | 7/2000 | ............ B65G 61/00 |
| RU | 2448029 | | 4/2012 | |

OTHER PUBLICATIONS

PCT International Search Report and Written Opinion dated Apr. 27, 2017, issued in PCT/US2017/016686.

* cited by examiner

*Primary Examiner* — Thomas Randazzo
(74) *Attorney, Agent, or Firm* — Weaver Austin Villeneuve & Sampson LLP

(57) ABSTRACT

Techniques are described that enable robotic picking systems to locate and pick boxes from an unstructured pallet using computer vision and/or one or more "exploratory picks" to determine the sizes and locations of boxes on the pallet.

29 Claims, 18 Drawing Sheets

Image 38
(Darker is closer to camera)

Image 50
- Darker is closer to camera

Image Difference 54

LOCATING, SEPARATING, AND PICKING BOXES WITH A SENSOR-GUIDED ROBOT

RELATED APPLICATION DATA

The present application is a non-provisional of and claims priority under 35 U.S.C. 119(e) to U.S. Provisional Patent Application No. 62/300,403 for Locating, Separating, and Picking Boxes With a Sensor-Guided Robot filed on Feb. 26, 2016, the entire disclosure of which is incorporated herein by reference for all purposes.

BACKGROUND

Box-like objects constitute a large percentage of objects that need to be picked (i.e., removed from a pallet or holding container) in industrial, manufacturing, logistics, and commercial environments. Box-like objects are typically characterized by at least one substantially planar picking surface. Conventional robotic picking of boxes can only handle known sizes, numbers, and types of boxes arranged in a uniform manner on a structured pallet. Using mechanical fixtures, some current systems pre-position a pallet of boxes so that a robot can pick them from known pre-programmed locations. Any deviation from this known structure, either in the size of the box, the number of boxes, or the location of boxes results in failure of the system. Some computer-vision-based systems rely on the boxes having clean edges only at their boundaries and cannot deal with boxes that have advertising, printed characters, printed logos, pictures, color, or any other texture on them. Such boxes have visual edges on their faces—i.e., edges that do not correspond to an actual physical boundary of the box. Current computer-vision-based systems cannot distinguish the physical edges between two different boxes from other visual edges on the faces of boxes, causing these systems to misjudge the size and position of the box(es). Picking and moving the box where the system has misjudged its size and location may either cause the box to slip from the grasp of the robot or may cause the robot to pick two or more boxes where it should have picked only one.

SUMMARY

Methods, apparatus, systems, and computer program products are described that relate to sensor-based techniques for controlling robotic picking of boxes in a variety of environments.

According to a particular class of implementations, a first image of a loaded pallet is captured. The loaded pallet has a plurality of boxes stacked thereon. A first representation of a surface of the loaded pallet is generated using the first image. A first box at a corner of the surface of the loaded pallet is moved a programmable amount using a robotic arm. A second image of the loaded pallet is captured including the first box as moved by the robotic arm. A second representation of the surface of the loaded pallet is generated using the second image. The first box is replaced with the robotic arm. The first and second representations of the surface of the loaded pallet are processed to generate a representation of a surface of the first box. The robotic arm is positioned relative to the first box using the representation of the surface of the first box. The first box is removed from the loaded pallet using the robotic arm.

According to a particular implementation, processing of the first and second representations of the surface of the loaded pallet includes determining a difference between the first and second representations of the surface of the loaded pallet, and determining a size and a position of the surface of the first box using the difference.

According to a particular implementation, the second image includes a representation of the robotic arm obscuring a portion of the surface of the first box. Processing of the first and second representations of the surface of the loaded pallet to generate a representation of the surface of the first box includes using data from both of the first and second representations of the surface of the loaded pallet to generate the representation of the surface of the first box.

According to a particular implementation, input is received representing a minimum box size for the boxes on the loaded pallet. Positioning of the robotic arm relative to the first box using the representation of the surface of the first box includes using the minimum box size.

According to a particular implementation, input is received representing a maximum box size for the boxes on the loaded pallet. Removing the first box from the loaded pallet using the robotic arm includes (1) lifting the first box above a top surface of the loaded pallet by at least a height associated with the maximum box size, or (2) moving the first box away from a side surface of the loaded pallet by at least a distance associated with the maximum box size.

According to a particular implementation, removing the first box from the loaded pallet using the robotic arm is accomplished without a priori knowledge of the number, sizes, orientations, and locations of the boxes on the loaded pallet.

According to a particular implementation, the first and second images are captured using a camera. A location of the camera is determined using a plurality of images of a fiducial held by the robotic arm in a corresponding plurality of positions.

According to a particular implementation, a location of the loaded pallet is determined using an image of a fiducial on an empty pallet.

According to a particular implementation, all of the boxes are unloaded from the loaded pallet while performing the capturing, generating, lifting, capturing, generating, releasing, and processing for fewer than all of the boxes.

According to a particular implementation, moving the first box includes one of (1) lifting the first box the programmable amount relative to the loaded pallet using the robotic arm, (2) moving the first box laterally relative to the loaded pallet using the robotic arm, or (3) tilting the first box relative to the surface of the loaded pallet using the robotic arm.

According to a particular implementation, the representation of the surface of the first box is stored. A third image of the loaded pallet is captured using the image capture device. The third image does not include the first box. A third representation of the surface of the loaded pallet is generated using the third image. One or more instances of a first box type corresponding to the first box is/are identified by comparing the third representation of the surface of the loaded pallet and the stored representation of the surface of the first box. This includes determining a location and orientation of each of the instances of the first box type. Each of the instances of the first box type is picked using the corresponding location and orientation.

According to a particular implementation, the representation of the surface of the first box is stored. An image of a different loaded pallet is captured using the image capture device. A representation of a surface of the different loaded pallet is generated using the image. One or more instances of a first box type corresponding to the first box is/are identified by comparing the representation of the surface of the different loaded pallet and the stored representation of the surface of the first box. This includes determining a location and orientation of each of the instances of the first box type. Each of the instances of the first box type is picked using the robotic arm and the corresponding location and orientation of each instance.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure. In addition, specific details may be provided in order to promote a thorough understanding of the described implementations. Some implementations within the scope of this disclosure may be practiced without some or all of these details. Further, well known features may not have been described in detail for the sake of clarity.

Described herein are implementations of robotic picking systems that can locate and pick boxes from an unstructured pallet using computer vision alone, or using one or more "exploratory picks" combined with computer vision to determine the sizes and locations of boxes. According to various implementations, the system uses computer vision and images (both 2D and/or 3D) from one or more visual sensors (e.g., one or more cameras) to determine the outermost corners of the top layer of a pallet of boxes. It then performs an exploratory pick using a robot and an attached gripper, lifting the outermost box from its corner by a small amount to separate it from the top layer. The system takes a new image of the pallet and the boxes and using computer vision again, and computes a difference between the two images to determine the size of the picked box and its position in the layer. It puts the box down and, using the computed size and position, picks it up again at its center to complete the task.

According to some implementations, the system learns the appearance of the picked face of the box the first time it picks a box of that appearance and then, on subsequent picks, attempts to identify other boxes with a matching appearance in the pallet. This allows the system to skip the exploratory pick for a box whose appearance it has learned, and instead determine the size and location of the center of the box from the previously learned appearance of the box.

Systems implemented as described herein enable a robot to correctly pick each box with a gripper centered at or near the physical center of a gripping face of the box and, in some cases with rectangular box faces, with the gripper aligned with the long axis of that face.

Figure 1:
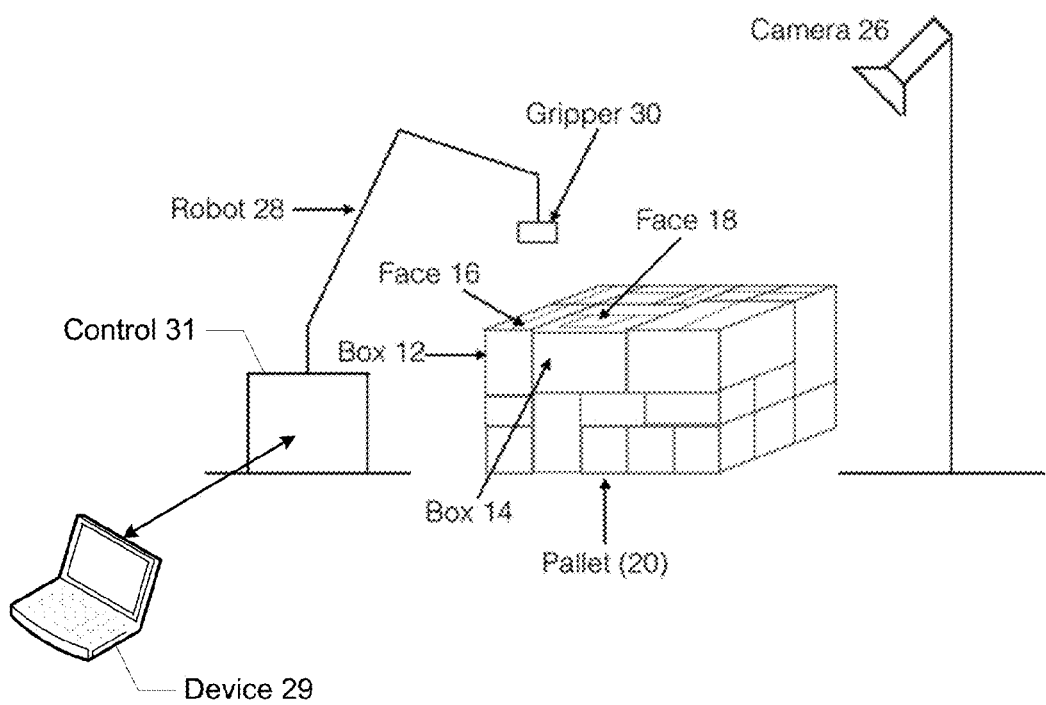
FIGS. 1, 5, 7, and 11 are illustrations of a pallet picking system implemented as described herein.

Referring now to FIG. 1, there is shown an example pallet of boxes 20 with two boxes 12 and 14 whose top faces 16 and 18 are on the same level with each other in the top layer of the pallet 20. A visual sensor (e.g., a camera) 26 is placed so that it can observe the pallet 20 from above. A robot 28 with attached gripper 30 is also present in the workspace. A computing device 29 in communication with robotic control system 31 enables automated control of the robot as described herein. Computing device 29 also provides user interfaces by which a human operator may interact with the system. As will be appreciated, computing device 29 may be any of a variety of computing devices and may be connected directly to control system 31, or may communicate with control system 31 via intervening devices and or networks.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. Suitable alternatives known to those of skill in the art may be employed.

According to particular implementations, robot 28 may be an MH80 robot or an MH5F robot from Yaskawa Motoman. However, it should be noted that, despite any references to particular robots, the techniques described herein can be applied to any robot with a single arm or arms, including a robot arm or robot arms mounted on a mobile base, serial chain robots with varying numbers of degrees of freedom and parallel-chain robots.

It should be noted that, despite any references to particular visual sensor placements, the system could be applied in multiple sensor placement configurations, including cases in which the sensor(s) is(are) mounted on a fixed platform, or in which the sensor(s) is(are) mounted on the gripper or other part of the robot arm, or in which the sensor(s) is(are) mounted on a moving platform (mobile robot) on which the robot arm is also mounted. Other variations will be apparent to those of skill in the art.

It should be noted that, despite any references to particular grippers, the system could be applied to robots with different types of grippers, including but not limited to vacuum grippers, electrostatic grippers, two fingered parallel jaw grippers, robot hands with a plurality of fingers, etc.

It should be noted that, despite any references to particular pallet geometry, the system could be applied to picking from any type of open container or open flat surface including but not limited to pallets, large boxes, 3 sided cages, shipping containers, bins or the back of trucks, vans, flat platforms, etc.

Figure 2:
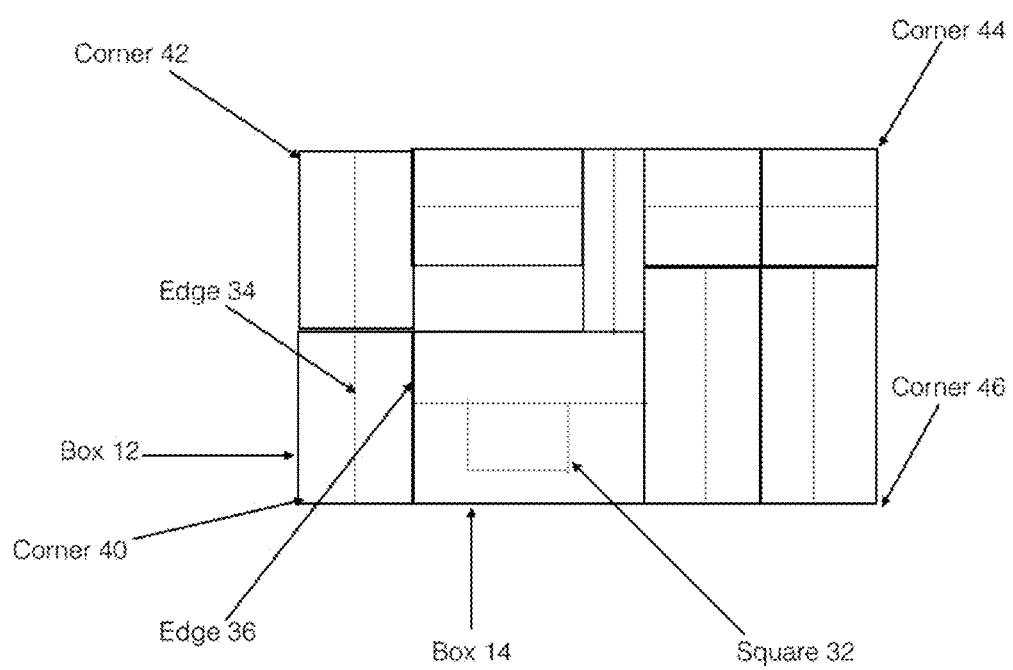
FIGS. 2, 12, 13, and 16 are representations of the tops of stacks of boxes on pallets.

FIG. 2 shows a top view of Pallet 20. Square 32 corresponds to printed edges on the surface of the Box 14. Edge 34 corresponds to the middle seam on the top face of the Box 12. Edge 36 corresponds to an actual physical boundary corresponding to the edges of Box 12 and Box 14. As will be described, and despite no a priori knowledge of the number, size, orientations, and locations of specific boxes, the robot is able to pick boxes 12 and 14 separately and avoid picking them both up at the same time.

Once the robot is powered on and its control system has properly booted, a human operator guides a system calibration (e.g., via computing device 29) in which the system learns the location of the pallet from which it will pick boxes and the location to which the picked boxes are to be delivered; in this example, a conveyor (not shown). A calibration fiducial is placed on the gripper, and the robot's arm is moved around to about 20 different poses which are captured by the camera so that the system can determine where the camera is in space. That is, because the robot arm's location in space is known to the system, the location of the camera can be determined by the different views of the fiducial at different known locations.

Another fiducial is placed on the center of the pallet and an image is taken so that the location of the pallet may be determined. The volume (length, width, height) of the pallet is specified by the operator and then connected to the location of the fiducial. A rendering of the virtual pallet is then shown to the operator on the screen superimposed on the image of the actual pallet to see how well they are aligned.

Because the relevant portion of the conveyor may not be in the view of the camera in a typical situation, the conveyor location may be determined by the operator manually driving the robot's arm until the gripper is touching the conveyor at the location at which the boxes are to be delivered.

The empty pallet is then replaced with a loaded pallet and the unloading process may begin. Each pick of a box on the pallet is referred to as a cycle. At the beginning of each cycle, the system checks to see whether the robot's arm is within a convex space defined by the bounding points of the front of the camera and the bounding points of the loaded pallet volume. If it is, then the arm is moved out of the way to a known good location to allow for an image to be captured. When the arm is determined to be out of the way, a 3D point cloud is generated from the camera image (depth and RGB) and the known pallet location. Visual information outside of the loaded pallet volume is ignored in subsequent processing.

Figure 3:
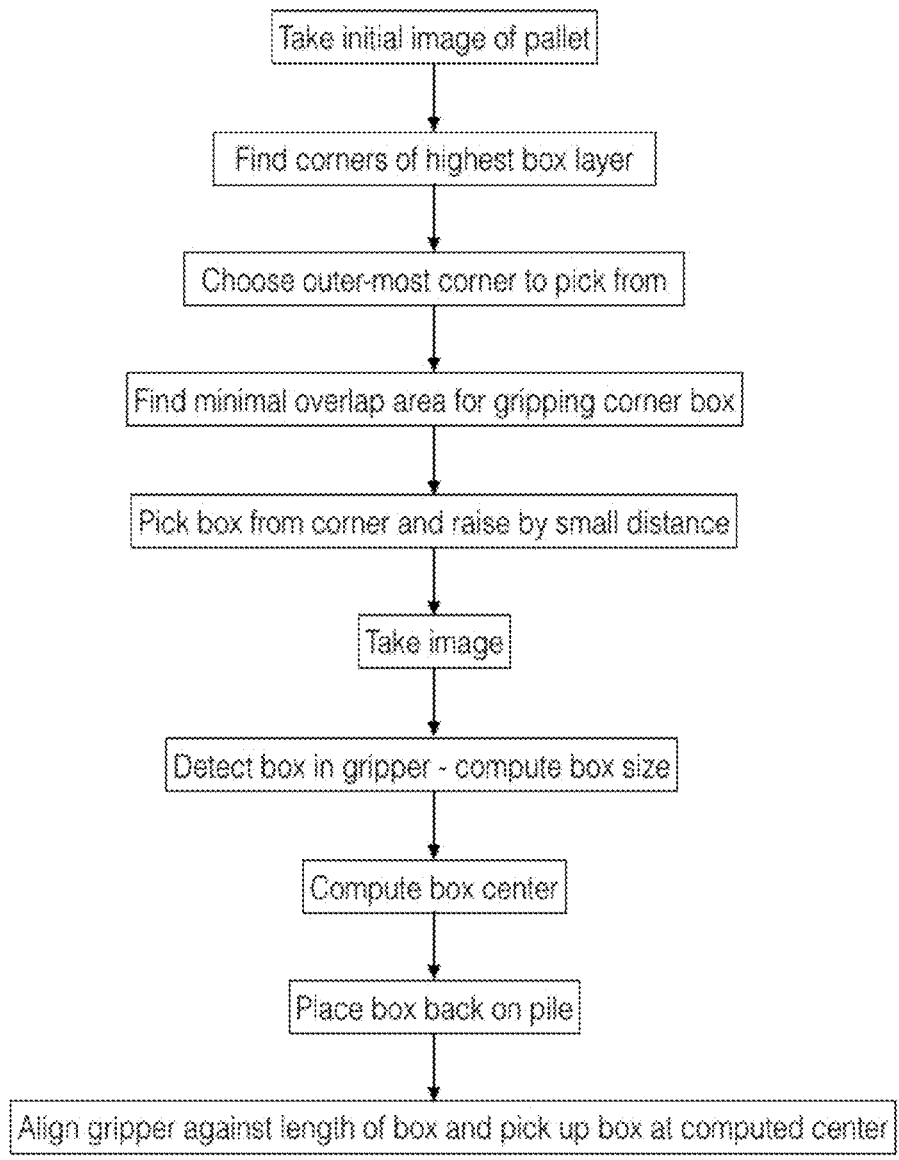
FIGS. 3 and 15 are flowcharts illustrating operation of particular implementations.
Figure 4:
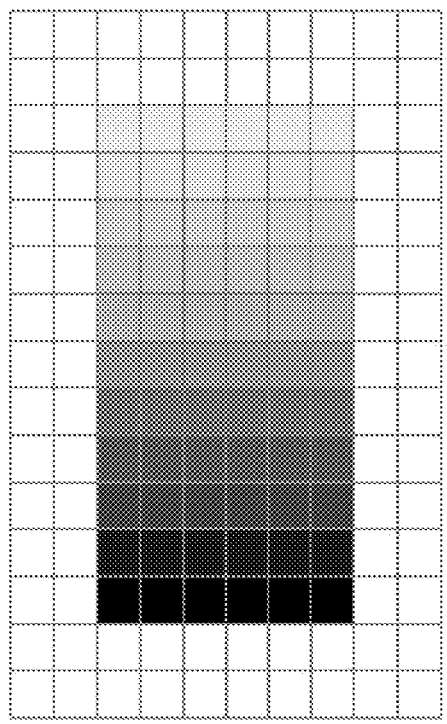
FIGS. 4, 6, 8, and 9 are representations of images of loaded pallets.

Referring to FIGS. 1 and 2, the flowchart in FIG. 3, and an exemplar image in FIG. 4, the system first takes a (3D and 2D) image 38 of Pallet 20 and uses computer vision to determine the outermost corners (40, 42, 44, 46) from the concave hull encompassing the 3D point cloud cluster corresponding to the top plane of Pallet 20 as shown in FIG. 2. In case of multiple clusters (corresponding to islands of adjacent boxes), the outermost corners are determined from the corners computed for each cluster. According to a particular implementation, the points of the 3D point cloud are sorted in the z-axis relative to the pallet and the highest points are selected, thereby generating a slice of the point cloud that includes representation of the top most surface of the pallet load. This information is projected onto 2 dimensions. As will be appreciated, this slice might include some rectangular shapes and some empty spaces representing one or more boxes that have already been picked. The outermost corners of the slice are then identified (e.g., by sorting the corners by distance from the center of the space).

The system then chooses to move the Gripper 30 using the Robot 28 to the closest corner 40, overlapping the box 12 in such a computed manner to only overlap box 12 while not overlapping box 14. The system computes the minimal overlap needed to grasp the box on the corner area using the known smallest possible size of the boxes. According to a particular implementation, the corner of the gripper on the robot's arm is positioned over one of these corners taking into account the size of the gripper and the smallest known box size (e.g., as specified by the operator) to ensure that the gripper does not grip more than one box at a time. This also takes into account the orientation of the rectangular gripper, preferring an orientation in which the gripper is farthest away from interfering with adjacent boxes. Getting the gripper in place requires calculation of a path plan, i.e., a sequence of joint angle motions of the robot arm that moves the gripper into place from its current known position to the desired position without hitting anything.

Figure 5:
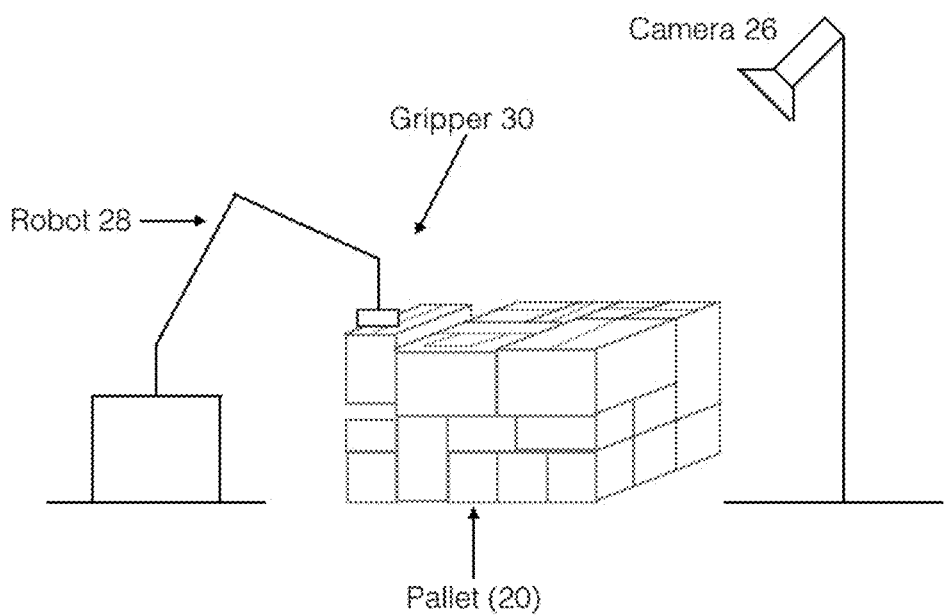

As illustrated in the flowchart in FIG. 3 and the perspective view of the robot and pallet in FIG. 5, using the gripper 30, the system picks the Box 12 vertically upwards by a small distance, such motion being possible since it is moving only a small distance even though it is not picking the Box 12 at its center. This is referred to as an "exploratory pick."

Figure 6:
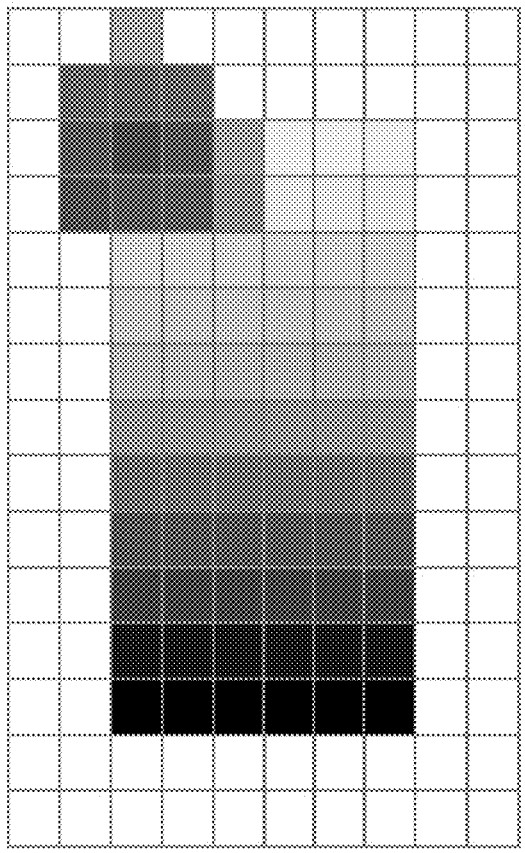

Referring to the flowchart in FIG. 3 and an exemplar 3D Image in FIG. 6, the system then takes a new image 50 of the pallet with the Sensor 26. Referring to FIG. 6, the new image 50 includes pixels corresponding to the robot and the gripper as well as the picked up box, all of which are within the field of view of the camera 26. Another 3D point cloud is generated from the new image that includes the moved box in its new position. A slice is taken from this new 3D point cloud that is above the previous slice by about the amount by which the box was lifted.

Figure 7:
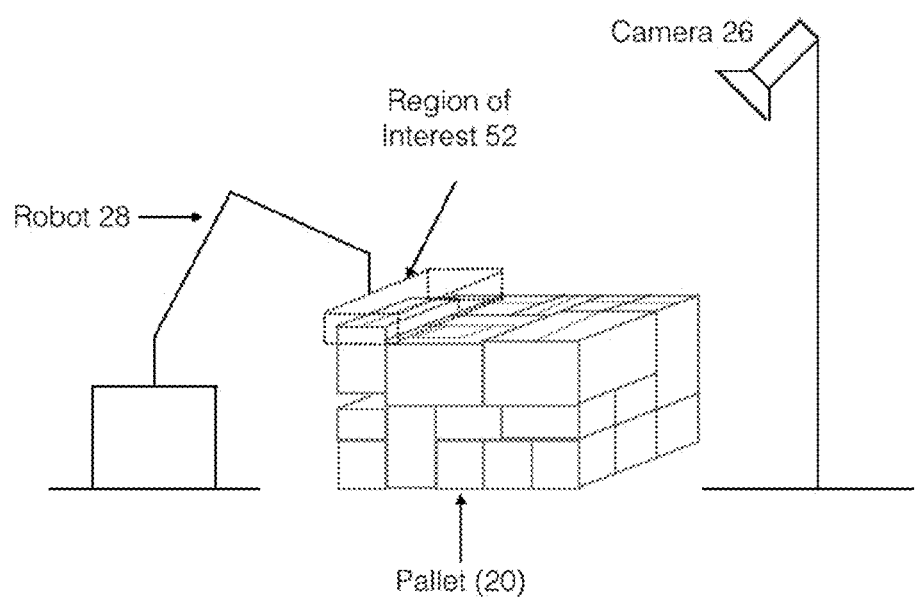
Figure 8:
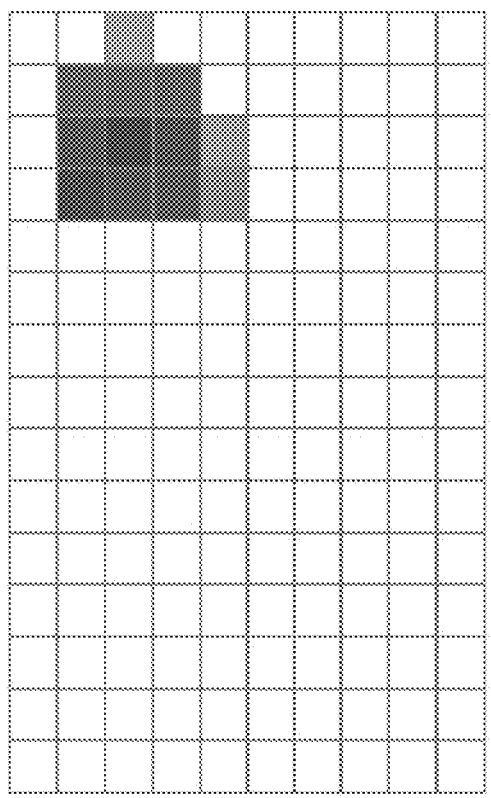

Referring to FIG. 7, the system examines the Image 50 in a short vertical region of interest 52 centered around the top surface of the picked box. Referring to FIG. 8, the Difference 54 between Image 38 and Image 50, corresponds to the Robot 28, the Gripper 30 and the Box 12 that the system has picked up.

Figure 9:
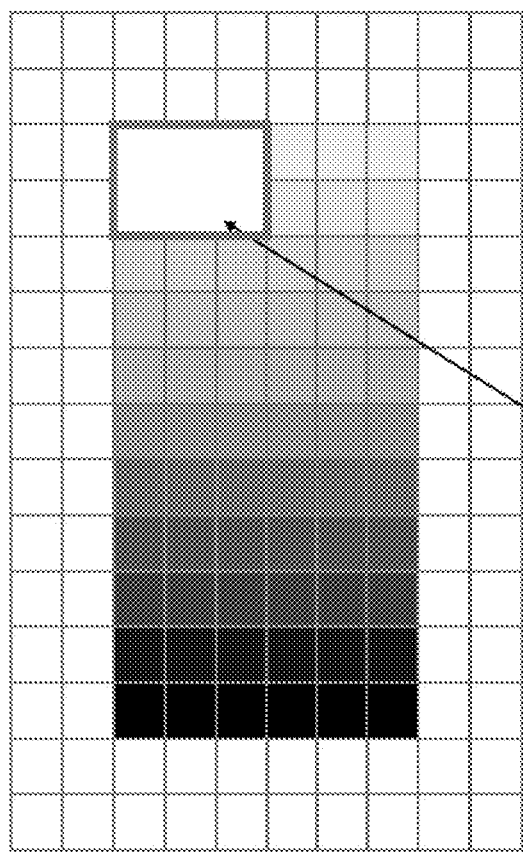
Figure 10:
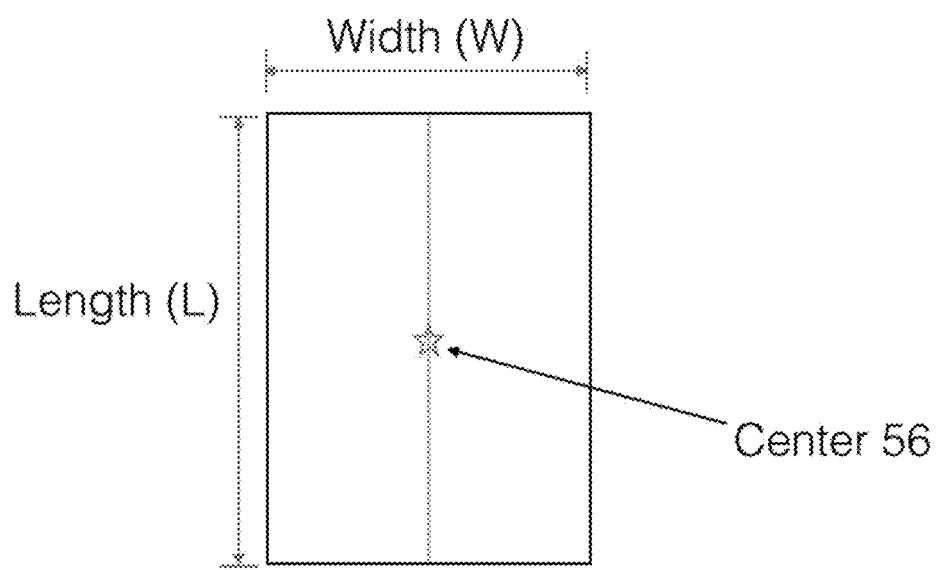
FIGS. 10 and 14 are representations of the tops of boxes.

Referring to FIG. 9, the system fits a plane in the original Image 38 to the pixels corresponding to the Difference 54. This plane corresponds to the top face 16 of Box 12 in FIG. 1. The system computes the size of the top face of the Box 12 using this plane as shown in FIG. 10. That is, the new slice is projected onto 2D and a 2D boundary is identified, taking into account the fact that it is known that the object being lifted is a box, to fit the best rectangle to the boundary.

Referring to the flowchart in FIG. 3 and the top view of the picked box in FIG. 10, the system also determines the Center 56 of the Box 12 using this Difference 54. As will be appreciated, part of the box is occluded by the gripper and the robot arm. But the corner of the box being occluded has already been represented in a previous processing step. So the rectangle being generated from the exploratory pick also includes this region of the slice.

Figure 11:
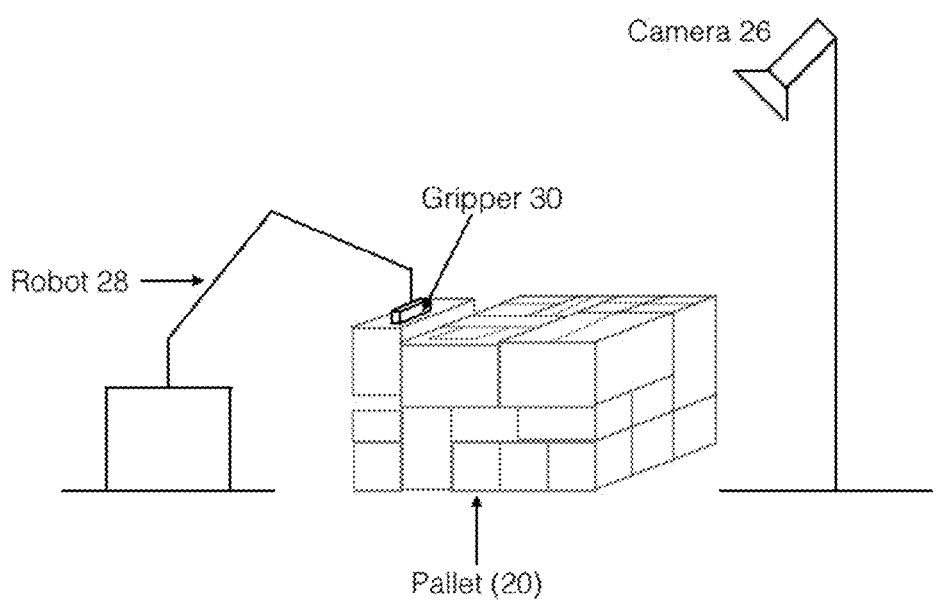

Referring to the flowchart in FIG. 3, the system now places the box back on the pallet, and repositions the Robot 28 with attached Gripper 30 to now pick the Box 12 at its Center 56, using an orientation that will best secure the box with the gripper (e.g., orienting the Gripper 30 along the longer edge of the box as shown in FIG. 11). The arm then lifts the box up by the maximum box height (e.g., as specified by the operator), plus some margin, above the top most surface of the pallet load (as determined from the recently generated point cloud).

The path plan for moving the gripped box to the conveyor is then calculated using a 3D model of the environment in which the pallet load may be represented simply as a rectangular box defined by the height of the highest known corners of the pallet load and the pallet itself. Thus, the system has successfully completed the pick of a box of hitherto unknown size.

An advantage associated with some implementations is the ability to separate and pick a physical box that may have multiple visual edges across its surfaces without confusing it for multiple physical boxes. For example, referring to FIG. 2, Square 32 and Edge 34 on the top faces 16 and 18 of Boxes 14 and 12, respectively, do not prevent the system from correctly recognizing the outer edges of Box 12.

It should be noted that an exploratory pick does not require the picked box to be grasped on its top surface and lifted vertically as described above. That is, implementations enabled by the present disclosure are contemplated in which an exploratory pick may be executed by grasping other surfaces of a box and/or moving the grasped box in other directions. For example, the box may be grasped on a side face and pulled outwards from the loaded pallet. Similarly, the system can also pick boxes that are not horizontal but tilted with respect to other boxes in the pile. More generally, an exploratory pick may be accomplished by grasping and moving a box on a loaded pallet in any way that allows for recognition of a relevant surface of the box as described herein.

Figure 12:
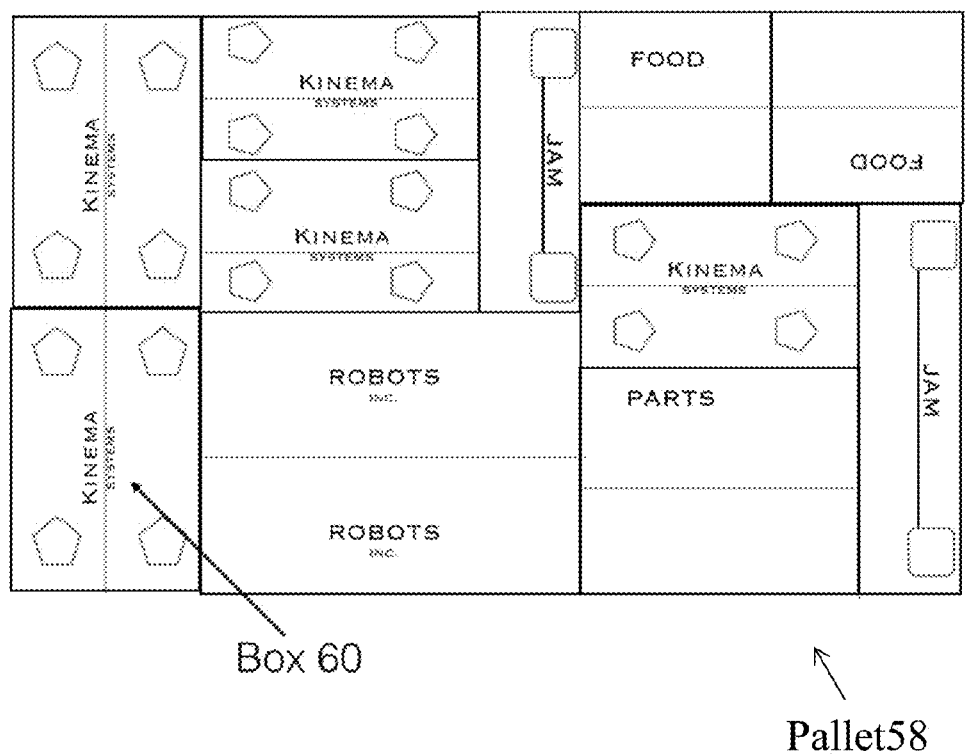
Figure 13:
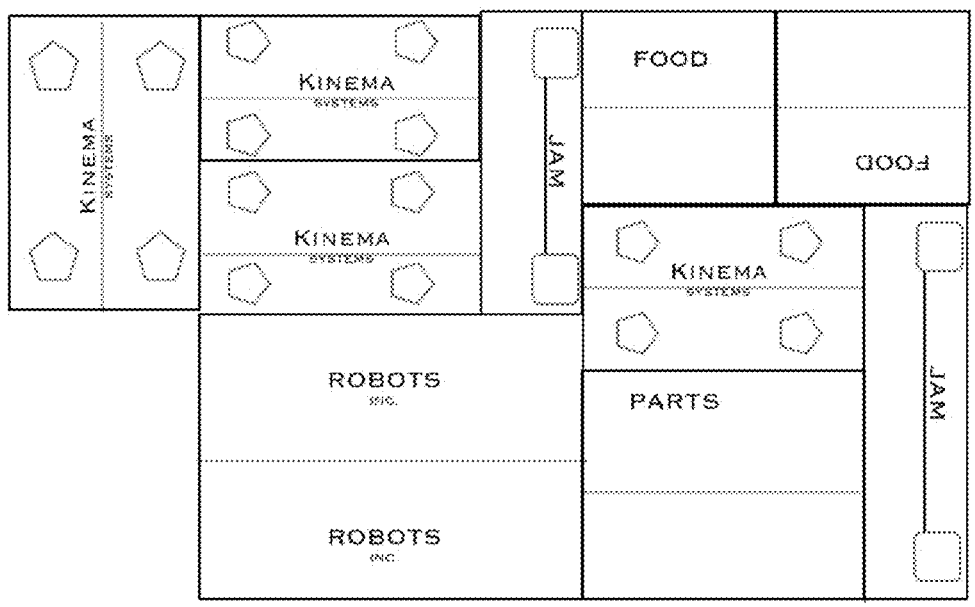
Figure 14:
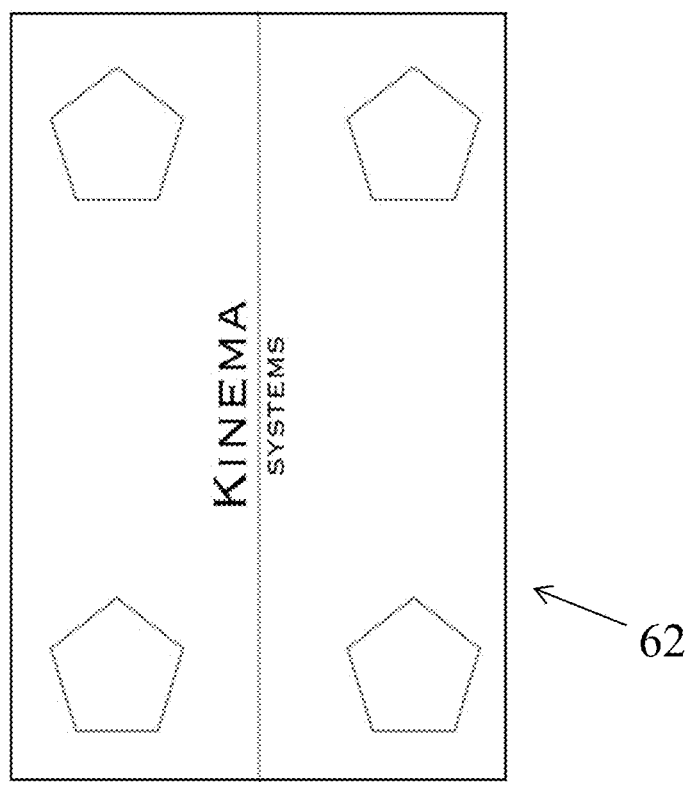

FIG. 12 shows a top view of different pallet of boxes, Pallet 58, with boxes with exemplar designs or text printed on their faces. The corner Box 60 is an exemplar box that will be the first box to be picked in this layer as outlined above. FIG. 13 shows a top view of the Pallet 58 after Box 60 has been picked. FIG. 14 shows the Difference 62 between the top view of the Pallet 58 before and after Box 60 has been picked. The Difference 62 represents the view of the system of the Box 60. The Difference 62 is used to compute a feature-based appearance model of Box 60.

That is, according to some implementations, the boundary of the box learned from an exploratory pick is used in conjunction with the data points from the original image to identify the box in the original image, and to generate a model for subsequent recognition of the same type of box. The model may include multiple representations of the top of the box to facilitate recognition in a way that is invariant to scale and rotation, as well as the angle of viewing. This might be done using a wide variety of feature extraction and description tools such as, for example, the Scale Invariant Feature Transform (SIFT) algorithm, the Speeded Up Robust Features (SURF) algorithm, the KAZE and AKAZE algorithms, the ORB algorithm, and related recognition techniques (e.g., such as those in the OpenCV library) may be used. These representations may then be used to identify other similar boxes on the pallet and so avoid having to execute an exploratory pick for each box.

In conjunction with the generation of a 2D representation of the top surface of the pallet, the stored models of known boxes are used to determine whether there are any boxes of known types that can be picked without using an exploratory pick. According to some implementations, this object recognition may be done each time a box is removed from the pallet. This may be advantageous where there is a significant likelihood that boxes may shift with each pick. Alternatively, more than one or even all of the boxes of the recognized type(s) may be removed from the pallet without redoing the object recognition steps. In addition, each time the system encounters a box boundary that it doesn't recognize, it adds a new model to the database. This is true even if the box corresponds to a model that has already been stored. Far from being a disadvantage, generating multiple models for the same box type can result in more efficient and robust system operation. And as will be appreciated, the stored models may not only be used to support subsequent picking of boxes on the same pallet, but also on subsequent pallets; potentially indefinitely into the future.

Figure 15:
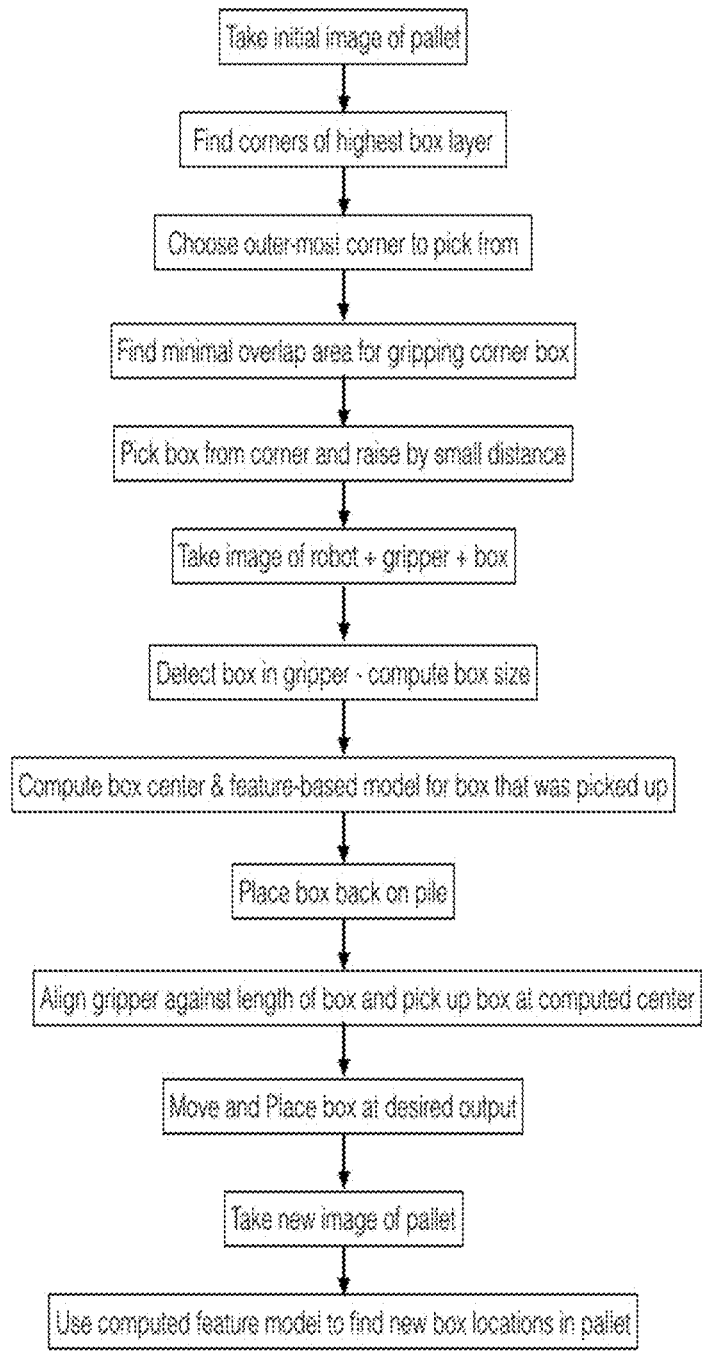
Figure 16:
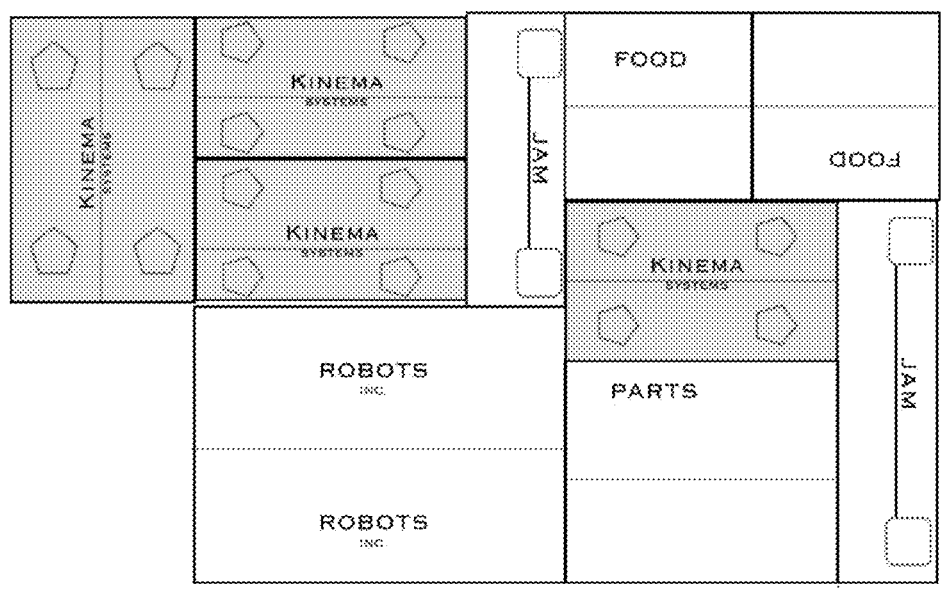
Figure 17:
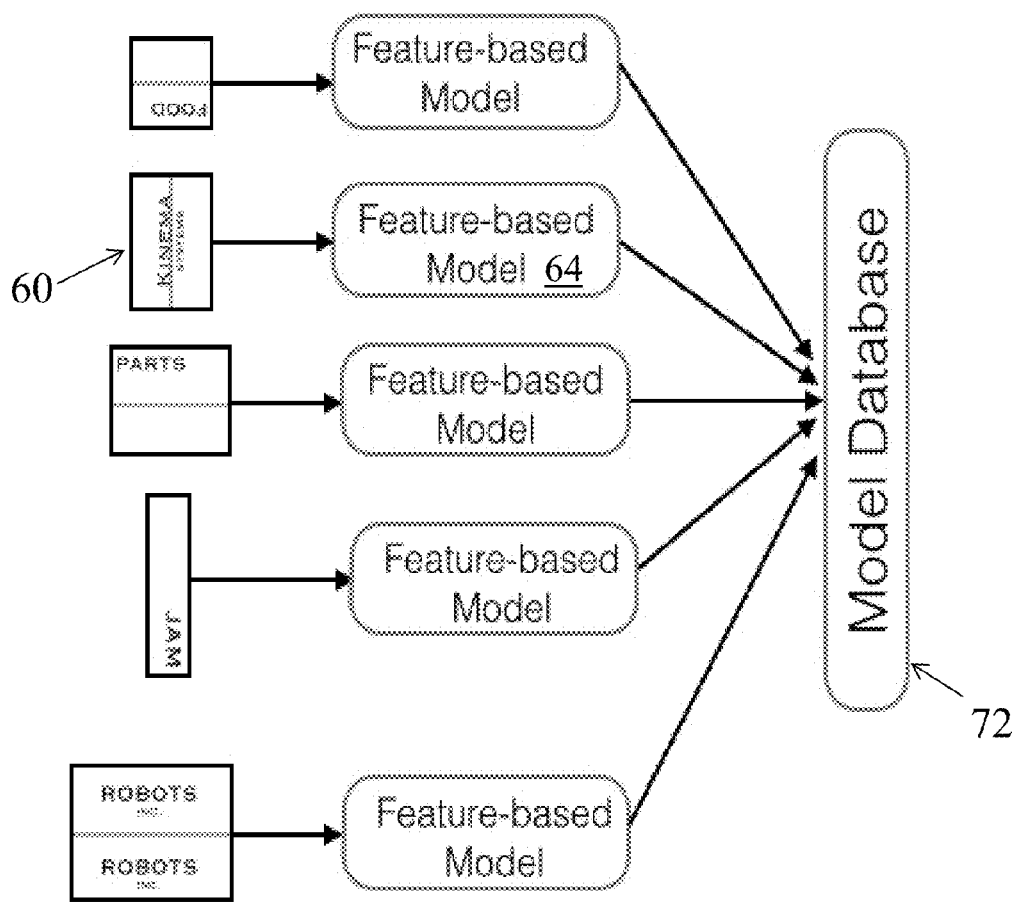
FIGS. 17 and 18 illustrate inputs to and use of a model database.
Figure 18:
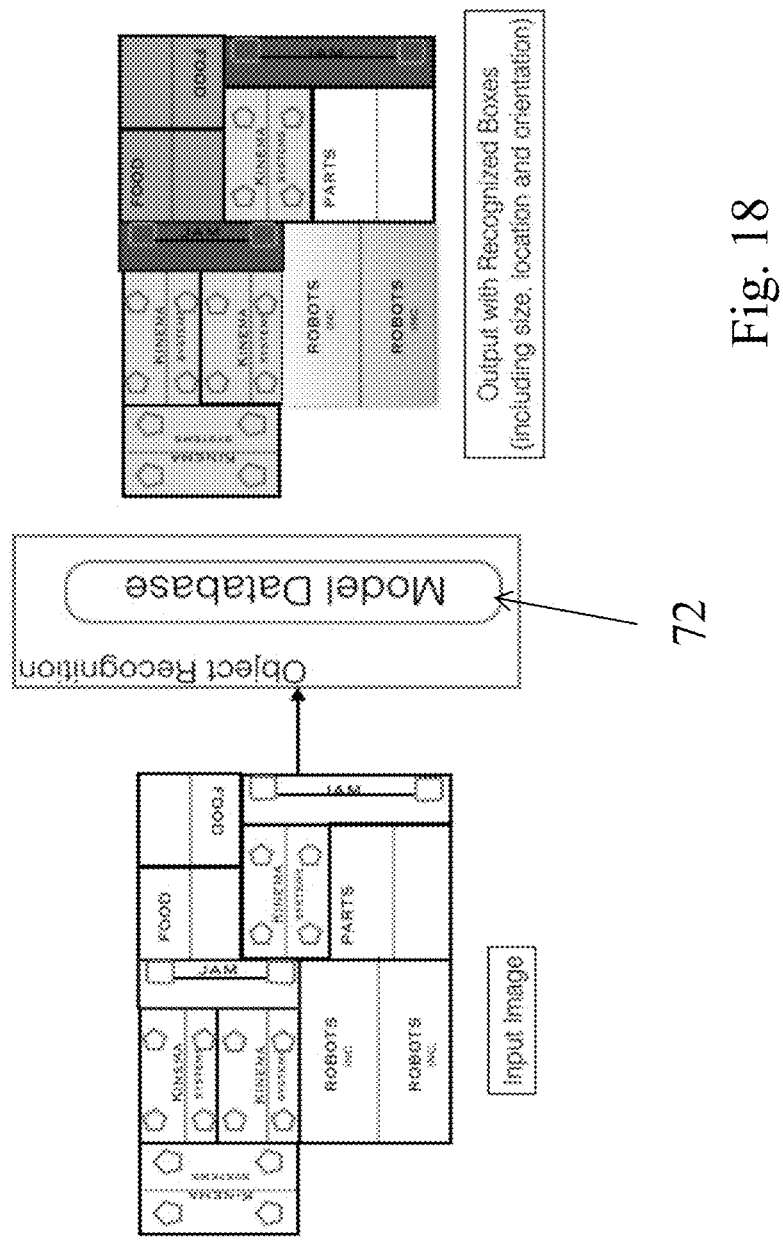

Referring to the flowchart in FIG. 15 and the diagram of FIG. 17, the Appearance Model 64 representing Box 60 is used to detect other boxes in the Pallet 58 that are similar to Box 60 as represented by the shaded boxes in FIG. 16. These boxes can now be directly picked by the robot without a need for an exploratory pick. As illustrated in FIG. 17, the Appearance Model 64 and the computed size and center of the Box 60 (along with models representing other box types) are added to a database of models 72. As illustrated in FIG. 18, the models in Database 72 are used to determine the position and center of boxes in a new pallet allowing the robot to pick up recognized boxes without needing a exploratory pick.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method, comprising:
capturing a first image of a loaded pallet, the loaded pallet having a plurality of boxes stacked thereon;
generating a first representation of a surface of the loaded pallet using the first image;
positioning a robotic arm relative to a corner of the surface of the loaded pallet based on a minimum box size for the boxes on the loaded pallet;
moving a first box at the corner of the surface of the loaded pallet a programmable amount using the robotic arm;
capturing a second image of the loaded pallet including the first box as moved by the robotic arm;
generating a second representation of the surface of the loaded pallet using the second image;
releasing the first box with the robotic arm;
processing the first and second representations of the surface of the loaded pallet to generate a representation of a surface of the first box;
positioning the robotic arm relative to the first box using the representation of the surface of the first box; and
removing the first box from the loaded pallet using the robotic arm.

2. The method of claim 1, wherein processing the first and second representations of the surface of the loaded pallet includes determining a difference between the first and second representations of the surface of the loaded pallet, and determining a size and a position of the surface of the first box using the difference.

3. The method of claim 1, wherein the second image includes a representation of the robotic arm obscuring a portion of the surface of the first box, and wherein processing the first and second representations of the surface of the loaded pallet to generate a representation of the surface of the first box includes using data from both of the first and second representations of the surface of the loaded pallet to generate the representation of the surface of the first box.

4. The method of claim 1, further comprising receiving input representing the minimum box size for the boxes on the loaded pallet, wherein positioning the robotic arm relative to the first box using the representation of the surface of the first box includes using the minimum box size.

5. The method of claim 1, further comprising receiving input representing a maximum box size for the boxes on the loaded pallet, wherein removing the first box from the loaded pallet using the robotic arm includes (1) lifting the first box above a top surface of the loaded pallet by at least a height associated with the maximum box size, or (2) moving the first box away from a side surface of the loaded pallet by at least a distance associated with the maximum box size.

6. The method of claim 1, wherein removing the first box from the loaded pallet using the robotic arm is accomplished without a priori knowledge of the number, sizes, orientations, and locations of the boxes on the loaded pallet.

7. The method of claim 1, wherein the first and second images are captured using a camera, the method further comprising determining a location of the camera using a plurality of images of a fiducial held by the robotic arm in a corresponding plurality of positions.

8. The method of claim 1, further comprising determining a location of the loaded pallet using an image of a fiducial on an empty pallet.

9. The method of claim 1, further comprising unloading all of the boxes from the loaded pallet while performing the capturing, generating, lifting, capturing, generating, releasing, and processing for fewer than all of the boxes.

10. The method of claim 1, wherein moving the first box comprises one of (1) lifting the first box the programmable amount relative to the loaded pallet using the robotic arm, (2) moving the first box laterally relative to the loaded pallet using the robotic arm, or (3) tilting the first box relative to the surface of the loaded pallet using the robotic arm.

11. The method of claim 1, further comprising:
storing the representation of the surface of the first box;
capturing a third image of the loaded pallet using the image capture device, the third image not including the first box;
generating a third representation of the surface of the loaded pallet using the third image;
identifying one or more instances of a first box type corresponding to the first box by comparing the third representation of the surface of the loaded pallet and the stored representation of the surface of the first box, including determining a location and orientation of each of the instances of the first box type; and
picking each of the instances of the first box type using the corresponding location and orientation.

12. The method of claim 1, further comprising:
storing the representation of the surface of the first box;
capturing an image of a different loaded pallet using the image capture device;
generating a representation of a surface of the different loaded pallet using the image;
identifying one or more instances of a first box type corresponding to the first box by comparing the representation of the surface of the different loaded pallet and the stored representation of the surface of the first box, including determining a location and orientation of each of the instances of the first box type; and
picking each of the instances of the first box type using the robotic arm and the corresponding location and orientation of each instance.

13. The method of claim 1, wherein the first and second representations of the surface of the loaded pallet are three-dimensional representations.

14. The method of claim 1, wherein moving the first box the programmable amount involves separating the first box from a top layer of the loaded pallet.

15. A system, comprising a computing device, a robotic arm, a robotic control system, and an image capture device, the computing device being configured to:
capture a first image of a loaded pallet using the image capture device, the loaded pallet having a plurality of boxes stacked thereon;
generate a first representation of a surface of the loaded pallet using the first image;
position the robotic arm relative to a corner of the surface of the loaded pallet based on a minimum box size for the boxes on the loaded pallet;
move a first box at the corner of the surface of the loaded pallet a programmable amount using the robotic arm via the robotic control system;
capture a second image of the loaded pallet using the image capture device, the second image including the first box as moved by the robotic arm;
generate a second representation of the surface of the loaded pallet using the second image;
release the first box using the robotic arm via the robotic control system;
process the first and second representations of the surface of the loaded pallet to generate a representation of a surface of the first box;
position the robotic arm relative to the first box via the robotic control system using the representation of the surface of the first box; and
remove the first box from the loaded pallet using the robotic arm via the robotic control system.

16. The system of claim 15, wherein the computing device is configured to process the first and second representations of the surface of the loaded pallet by determining a difference between the first and second representations of the surface of the loaded pallet, and determining a size and a position of the surface of the first box using the difference.

17. The system of claim 15, wherein the second image includes a representation of the robotic arm obscuring a portion of the surface of the first box, and wherein the computing device is configured to process the first and second representations of the surface of the loaded pallet to generate a representation of the surface of the first box by using data from both of the first and second representations of the surface of the loaded pallet to generate the representation of the surface of the first box.

18. The system of claim 15, wherein the computing device is further configured to receive input representing the minimum box size for the boxes on the loaded pallet, and wherein the computing device is configured to position the robotic arm relative to the first box using the representation of the surface of the first box by using the minimum box size.

19. The system of claim 15, wherein the computing device is further configured to receive input representing a maximum box size for the boxes on the loaded pallet, and wherein the computing device is configured to remove the first box from the loaded pallet using the robotic arm by (1) lifting the first box above a top surface of the loaded pallet by at least a height associated with the maximum box size, or (2) moving the first box away from a side surface of the loaded pallet by at least a distance associated with the maximum box size.

20. The system of claim 15, wherein the computing device is configured to remove the first box from the loaded pallet using the robotic arm without a priori knowledge of the number, sizes, orientations, and locations of the boxes on the loaded pallet.

21. The system of claim 15, wherein the computing device is further configured to determine a location of the image capture device using a plurality of images of a fiducial held by the robotic arm in a corresponding plurality of positions.

22. The system of claim 15, wherein the computing device is further configured to determine a location of the loaded pallet using an image of a fiducial on an empty pallet.

23. The system of claim 15, wherein the computing device is further configured to unload all of the boxes from the loaded pallet using the robotic arm while performing the capturing, generating, lifting, capturing, generating, releasing, and processing for fewer than all of the boxes.

24. The system of claim 15, wherein the computing device is further configured to move the first box by one of (1) lifting the first box the programmable amount relative to the loaded pallet using the robotic arm, (2) moving the first box laterally relative to the loaded pallet using the robotic arm, or (3) tilting the first box relative to the surface of the loaded pallet using the robotic arm.

25. The system of claim 15, wherein the computing device is further configured to:
store the representation of the surface of the first box;
capture a third image of the loaded pallet using the image capture device, the third image not including the first box;
generate a third representation of the surface of the loaded pallet using the third image;
identify one or more instances of a first box type corresponding to the first box by comparing the third representation of the surface of the loaded pallet and the stored representation of the surface of the first box, including determining a location and orientation of each of the instances of the first box type; and
pick each of the instances of the first box type using the robotic arm and the corresponding location and orientation of each instance.

26. The system of claim 15, wherein the computing device is further configured to:
store the representation of the surface of the first box;
capture an image of a different loaded pallet using the image capture device;
generate a representation of a surface of the different loaded pallet using the image;
identify one or more instances of a first box type corresponding to the first box by comparing the representation of the surface of the different loaded pallet and the stored representation of the surface of the first box, including determining a location and orientation of each of the instances of the first box type; and
pick each of the instances of the first box type using the robotic arm and the corresponding location and orientation of each instance.

27. The system of claim 15, wherein the first and second representations of the surface of the loaded pallet are three-dimensional representations.

28. The system of claim 15, wherein the computing device is configured to move the first box the programmable amount by separating the first box from a top layer of the loaded pallet.

29. A computer program product, comprising one or more computer-readable media having computer program instructions stored therein, the computer program instructions being configured such that, when executed by one or more computing devices, the computer program instructions cause the one or more computing devices to:
capture a first image of a loaded pallet, the loaded pallet having a plurality of boxes stacked thereon;
generate a first representation of a surface of the loaded pallet using the first image;
position a robotic arm relative to a corner of the surface of the loaded pallet based on a minimum box size for the boxes on the loaded pallet;
move a first box at the corner of the surface of the loaded pallet a programmable amount using the robotic arm;
capture a second image of the loaded pallet including the first box as moved by the robotic arm;
generate a second representation of the surface of the loaded pallet using the second image;
release the first box using the robotic arm;
process the first and second representations of the surface of the loaded pallet to generate a representation of a surface of the first box;
position the robotic arm relative to the first box using the representation of the surface of the first box; and
remove the first box from the loaded pallet using the robotic arm.

* * * * *